UNITED STATES PATENT OFFICE

ARNOLD M. DEAN, OF KALAMAZOO, MICHIGAN.

IMPROVEMENT IN ELASTIC PAINTS.

Specification forming part of Letters Patent No. 174,665, dated March 14, 1876; application filed July 29, 1875.

*To all whom it may concern:*

Be it known that I, ARNOLD M. DEAN, of Kalamazoo, county of Kalamazoo and State of Michigan, have invented a new and useful compound to be used for painting the outside or inside of houses or any other structure, and for general purposes, of which the following is a specification:

This invention consists in a composition formed by mixing resin, linseed-oil, naphtha, water, oxide of zinc or other pigment and bicarbonate of soda. The object of bicarbonate of soda is to unite the ingredients more readily and easily. In lieu of bicarbonate of soda, any equivalent alkali may be employed.

To make five (5) gallons of paint, take about two (2) pounds resin and one (1) quart linseed-oil, (when desired, part of the resin can be left out and india-rubber substituted in its place;) melt together over a slow fire in a suitable vessel. When the resin is all melted, add five (5) quarts more linseed-oil. Stir or agitate the whole until it is thoroughly mixed. Let stand until cool. Then take five (5) quarts water, put in one-fourth ($\frac{1}{4}$) ounce bicarbonate of soda, which is right for zinc or lead—other pigments require more, some require less—stir until it is well mixed; then add about two and a half ($2\frac{1}{2}$) quarts naphtha, then thoroughly mix all together; then add twenty (20) pounds oxide of zinc or other pigments; then stir or agitate the whole until thoroughly mixed. In the time of mixing add about two and a half ($2\frac{1}{2}$) quarts more of naphtha. If it should be too thick, stir in linseed-oil until it is as thin as required. This makes a durable, elastic, and firm paint, and will withstand the action of the weather a long time.

To make the different colors or tints, use any pigment or combination of pigments desired.

What I claim as new, and desire to secure by Letters Patent, is—

The elastic-paint compound, consisting of bicarbonate of soda, resin, linseed-oil, water, naphtha, and oxide of zinc, as and for the purpose described.

ARNOLD M. DEAN.

Witnesses:
GEORGE W. DAWSON,
JOHN HENRY DEAN.